No. 792,403. PATENTED JUNE 13, 1905.
C. G. CROSSE.
UNICYCLE.
APPLICATION FILED SEPT. 14, 1904.
2 SHEETS—SHEET 1.
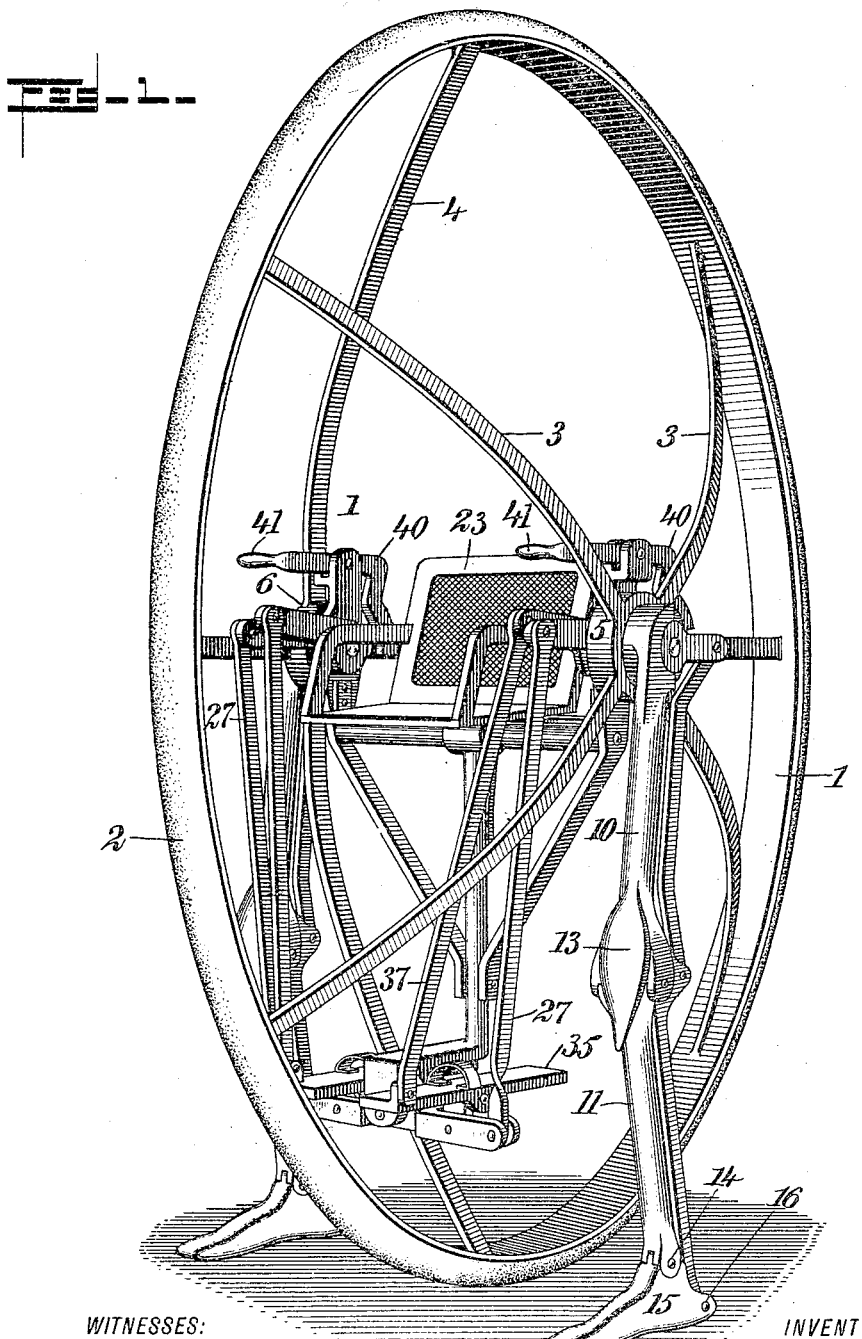
WITNESSES:
N. C. Abbott
W. M. Avery
INVENTOR
Charles G. Crosse
BY
ATTORNEYS No. 792,403. PATENTED JUNE 13, 1905.
C. G. CROSSE.
UNICYCLE.
APPLICATION FILED SEPT. 14, 1904.
2 SHEETS—SHEET 2.
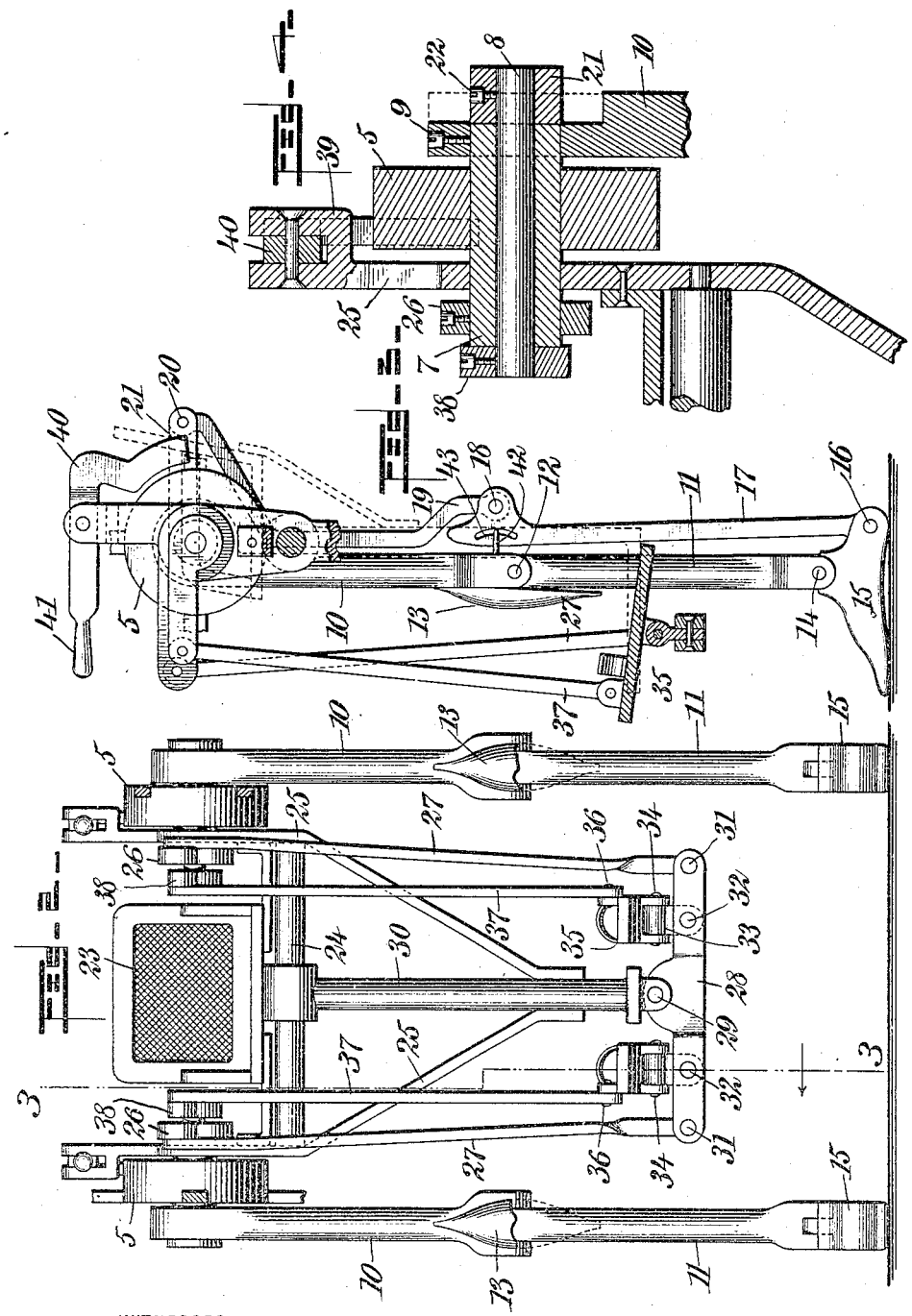
WITNESSES:
INVENTOR
Charles G. Crosse
BY
ATTORNEYS No. 792,403.

Patented June 13, 1905.

UNITED STATES PATENT OFFICE.

CHARLES G. CROSSE, OF SUN PRAIRIE, WISCONSIN.

UNICYCLE.

SPECIFICATION forming part of Letters Patent No. 792,403, dated June 13, 1905.

Application filed September 14, 1904. Serial No. 224,372.

*To all whom it may concern:*

Be it known that I, CHARLES G. CROSSE, a citizen of the United States, and a resident of Sun Prairie, in the county of Dane and State of Wisconsin, have invented a new and Improved Unicycle, of which the following is a full, clear, and exact description.

My invention is an improvement in unicycles, and relates to the means for propelling the same.

It further consists in the construction and combination of parts, as will more fully appear in the detailed description appended hereto and definitely set forth in the claims.

Reference is to be had to the accompanying drawings, forming a part of this specification, in which similar characters of reference indicate corresponding parts in all the views.

Figure 1 is a perspective view of my unicycle. Fig. 2 is a front view of the seat and propelling mechanism without the wheel. Fig. 3 is a section on the line 3 3 of Fig. 2 looking in the direction of the arrow, and Fig. 4 is an enlarged detail section taken vertically through the axis of the wheel.

My unicycle consists of a wheel 1, having a rubber tire 2, as usual. This wheel has two sets of spokes 3 4, which connect to hubs 5 6, centrally located. The driving mechanism is of manikin form and closely resembles the human leg. It is duplicated for the two hubs, so that a description of one will serve for both.

A sleeve 7 bears in the hub 5, and a rod 8 bears in the sleeve 7. Attached rigidly by a set-screw 9 or equivalent means to the sleeve 7 is a rod 10, which corresponds to the femur bone in the human leg. To the lower end of this rod 10 is secured another rod 11 by means of a pivot 12. A member 13, corresponding to the knee-cap, is fastened at one end to the rod 10 in any suitable manner. This cap protects the joint between the rods 10 and 11. At the lower end of the rod 11, by means of a pivot 14, is attached a member 15, which represents the human foot. To the heel of this foot is pivotally attached at 16 a rod 17, which is in turn pivotally connected at 18 with a rod 19, extending upward and connecting at 20 pivotally with a crank-arm 21. This crank-arm 21 is rigidly attached, by means of a set-screw 22, to the rod 8.

On the inside of the wheel a seat 23 is supported upon a rod 24, which is mounted in a frame composed of side pieces 25, freely supported on the sleeve 7. This seat is intended for supporting the operator when the machine is in use.

Inside of the side piece 25 is rigidly attached to the sleeve 7 a crank 26, and this crank is connected, by means of a link 27, to a bar 28, pivotally supported at 29 on a rod 30, extending downward from the rod 24, the bar 28 being pivoted at its center and the link 27 pivoted to the bar 28 at 31. Between the pivots 31 and 29 is located another pivot 32, by means of which an eye 33 is attached to the rod 28. Pivotally connected with this eye at 34 is a pedal 35, and pivotally attached to the pedal at 36 is a link 37, which is pivotally attached at its opposite end to a crank 38, rigidly mounted on the rod 8. The means for connecting the cranks 26 and 38 is preferably a set-screw; but any other form of fastening may be used instead.

At the upper end of the side pieces 25 are U-shaped extensions 39, in which is pivotally mounted a lever 40, the lower end of which is formed with an inner edge in the shape of an arc to coöperate with the hub 5 of the wheel. By means of handles 41 at the ends of these levers a braking action can be exerted upon the hubs of the wheel, thus retarding its movement.

The rod 17 is confined to an up-and-down movement by means of a staple 42, working in a slot 43 and fastened rigidly to the rod 10. As stated above, the mechanism on the opposite side of the wheel is an exact duplicate of that described above.

The operation of the device is as follows: The pedal 35 is pressed by the foot of the operator, which depresses one side of the bar 28 and pulls down the cranks 26 and 38. This gives a corresponding oscillatory motion to the rods 10 and 19, which in turn operate the rods 17 and 11, and the rod 17 also operates the foot 15. This simulates the motion of the human leg and foot and exerts a pushing force in a forward direction, thus urging the wheel forward. By reference to the figures of the drawings it will be seen that when the one pedal is depressed the other is elevated, thus giving the reverse movements to the parts described, and by operating the opposite pedal the same action takes place with respect to the leg on the opposite side.

Having thus described my invention, I claim as new and desire to secure by Letters Patent—

1. In a unicycle, the combination of a wheel, a support for the operator, mounted in said wheel, lever mechanism outside said wheel, for engaging the ground to push the wheel along, and mechanism inside the wheel, connected to said outside mechanism for operating the same, substantially as described.

2. In a unicycle, the combination of a wheel, a support for the operator, mounted in said wheel, jointed lever mechanism outside said wheel, for engaging the ground to push the wheel along, and pedal mechanism inside the wheel, adapted to be operated by the feet, and connected to said outside mechanism, for operating the same, substantially as described.

3. In a unicycle, the combination of a wheel, a support for the operator, mounted in said wheel, jointed mechanism outside said wheel, for pushing it along the said mechanism including a foot member, and mechanism inside the wheel, adapted to be operated by the foot, connected to said outside mechanism for operating the same, substantially as described.

4. In a unicycle, the combination of a wheel, a support for the operator, mounted in said wheel, mechanism outside said wheel, for pushing it along, the said mechanism comprising jointed rods and a foot carried thereby, at each side of the wheel, mechanism inside the wheel, adapted to be operated by the foot, connected to said outside mechanism for operating the same, and a brake for said wheel, mounted on the operator's support, substantially as described.

5. In a unicycle, the combination of a wheel, mechanism representing the human leg on each side of said wheel and comprising jointed rods and a foot member, a support for the operator, inside the wheel, and a pedal mounted on said support and connected to said outside mechanism, for operating the parts on opposite sides successively, substantially as described.

6. In a unicycle, the combination of a wheel, mechanism on each side of said wheel for pushing it along, a support for the operator, inside the wheel, a bar pivotally mounted on the lower end of said support, and a pedal mounted on said bar and connected to said outside mechanism, for operating the parts on opposite sides successively, substantially as described.

7. In a unicycle, the combination of a wheel, mechanism, on each side of said wheel for pushing it along, a support for the operator, inside the wheel, a bar pivotally mounted on the lower end of said support, and a pedal mounted on said bar, on opposite sides of its pivot, and connected to said outside mechanism, for operating the parts on opposite sides successively, substantially as described.

8. In a unicycle, the combination of a wheel, and mechanism representing the human leg on each side of said wheel, said mechanism consisting of rods 10 and 11 hinged together, a foot 15 and hinged rods 17 and 19 connecting the heel of the foot with the operating mechanism inside the wheel, said inside mechanism consisting of a support, pedals mounted on said support, connecting rods and cranks for connecting said pedals with the outside mechanism, substantially as described.

9. In a unicycle, the combination of a wheel, mechanism representing the human leg on each side of said wheel, said mechanism consisting of rods 10 and 11 hinged together, a foot 15 and hinged rods 17 and 19 connecting the heel of the foot with a rod passing through the hub of the wheel, a crank on said rod, a support on the inside of the wheel, a bar pivotally mounted on said support, pedals mounted on said bar, on opposite sides of the pivot, links connecting said pedals with their respective cranks, and means also connected to said bar, for oscillating the rods 10 about the axis of the wheel, substantially as described.

In testimony whereof I have signed my name to this specification in the presence of two subscribing witnesses.

CHARLES G. CROSSE.

Witnesses:
G. W. BULL,
THEO P. CROSSE.